United States Patent [19]

Akashi

[11] Patent Number: 5,585,882
[45] Date of Patent: Dec. 17, 1996

[54] FOCUS DETECTING APPARATUS DETECTING FOCUS TO A PLURALITY OF AREAS

[75] Inventor: Akira Akashi, Yokohama, Japan

[73] Assignee: Canon Kabushiki Kaisha, Tokyo, Japan

[21] Appl. No.: 181,957

[22] Filed: Jan. 18, 1994

Related U.S. Application Data

[63] Continuation of Ser. No. 19,326, Feb. 12, 1993, abandoned, which is a continuation of Ser. No. 610,575, Nov. 8, 1990, abandoned.

[30] Foreign Application Priority Data

Nov. 10, 1989 [JP] Japan ................................. 1-291129
Nov. 10, 1989 [JP] Japan ................................. 1-291130
Nov. 10, 1989 [JP] Japan ................................. 1-291131
Nov. 10, 1989 [JP] Japan ................................. 1-291132

[51] Int. Cl.$^6$ ........................................... G03B 13/36
[52] U.S. Cl. .................................. 396/123; 396/121
[58] Field of Search .............................. 354/400, 402, 354/403, 406, 407, 408; 250/201.2, 201.8

[56] References Cited

U.S. PATENT DOCUMENTS

| | | | |
|---|---|---|---|
| 4,812,868 | 3/1989 | Utagawa et al. | 354/402 |
| 4,812,869 | 3/1989 | Akashi et al. | 354/408 |
| 4,857,718 | 8/1989 | Karasaki et al. | 250/201 |
| 4,878,079 | 10/1989 | Hamada et al. | 354/402 |
| 4,988,856 | 1/1991 | Hamada et al. | 250/201.8 |
| 5,023,646 | 6/1991 | Ishida et al. | 354/402 |

FOREIGN PATENT DOCUMENTS 2213602  8/1989  United Kingdom.

*Primary Examiner*—W. B. Perkey
*Attorney, Agent, or Firm*—Fitzpatrick, Cella, Harper & Scinto

[57] ABSTRACT

A focus detecting apparatus for receiving light energy passed through an objective and detecting the focus adjusted state is provided with defocus amount detection means for repetitively detecting the defocus amounts of a plurality of areas in a view relating to the objective, operating means for starting the defocus amount detecting operation of the defocus amount detection means, selection means for selecting at least one of the plurality of areas, discrimination means for discriminating whether the selected area is an area of a predetermined condition, prohibition means for prohibiting a new selecting operation of the selection means as long as it is discriminated by the discrimination means that the selected area is an area of a predetermined condition, and release means for releasing the prohibiting operation of the prohibition means by the release of the operation of the operating means.

8 Claims, 11 Drawing Sheets

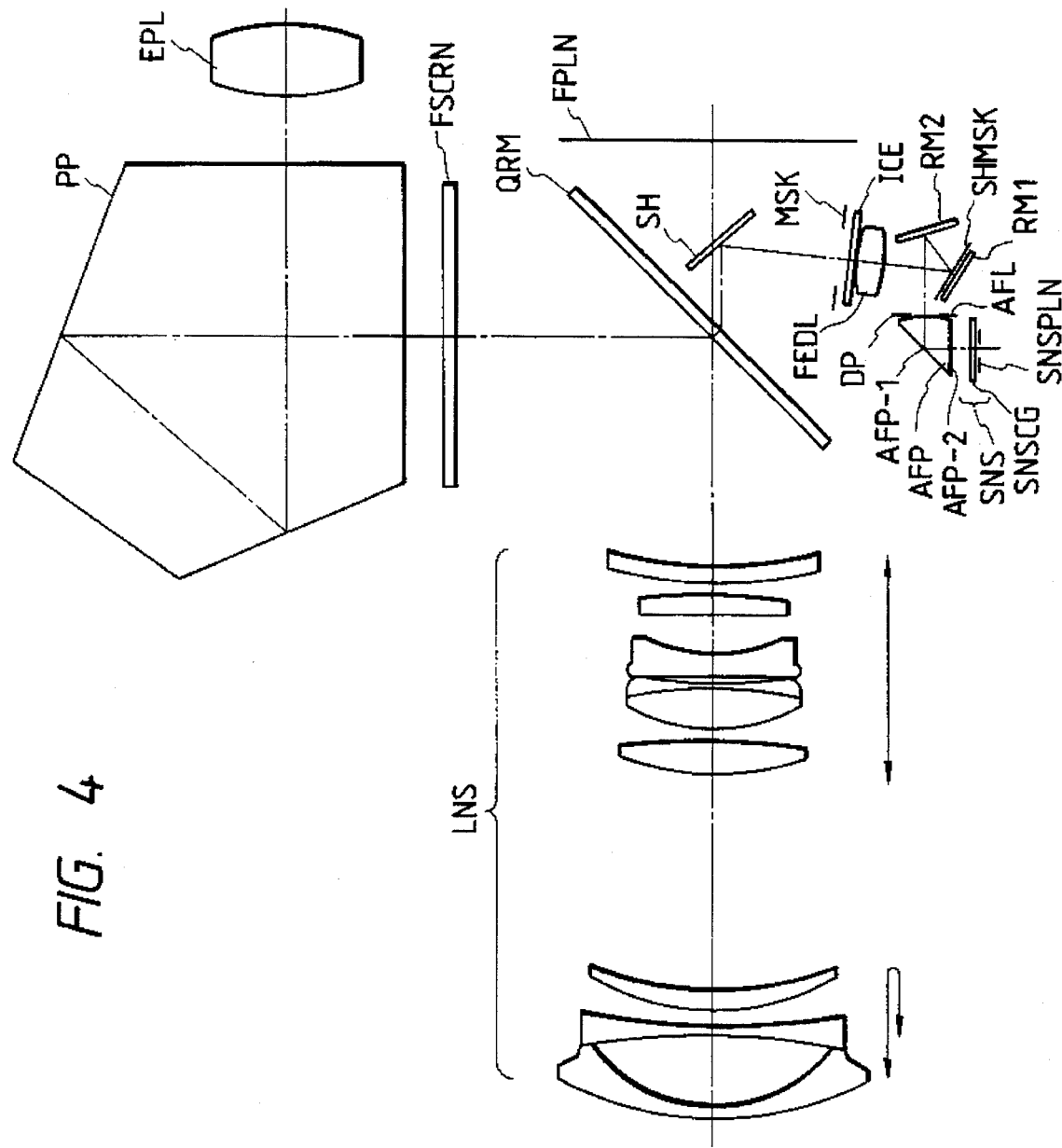

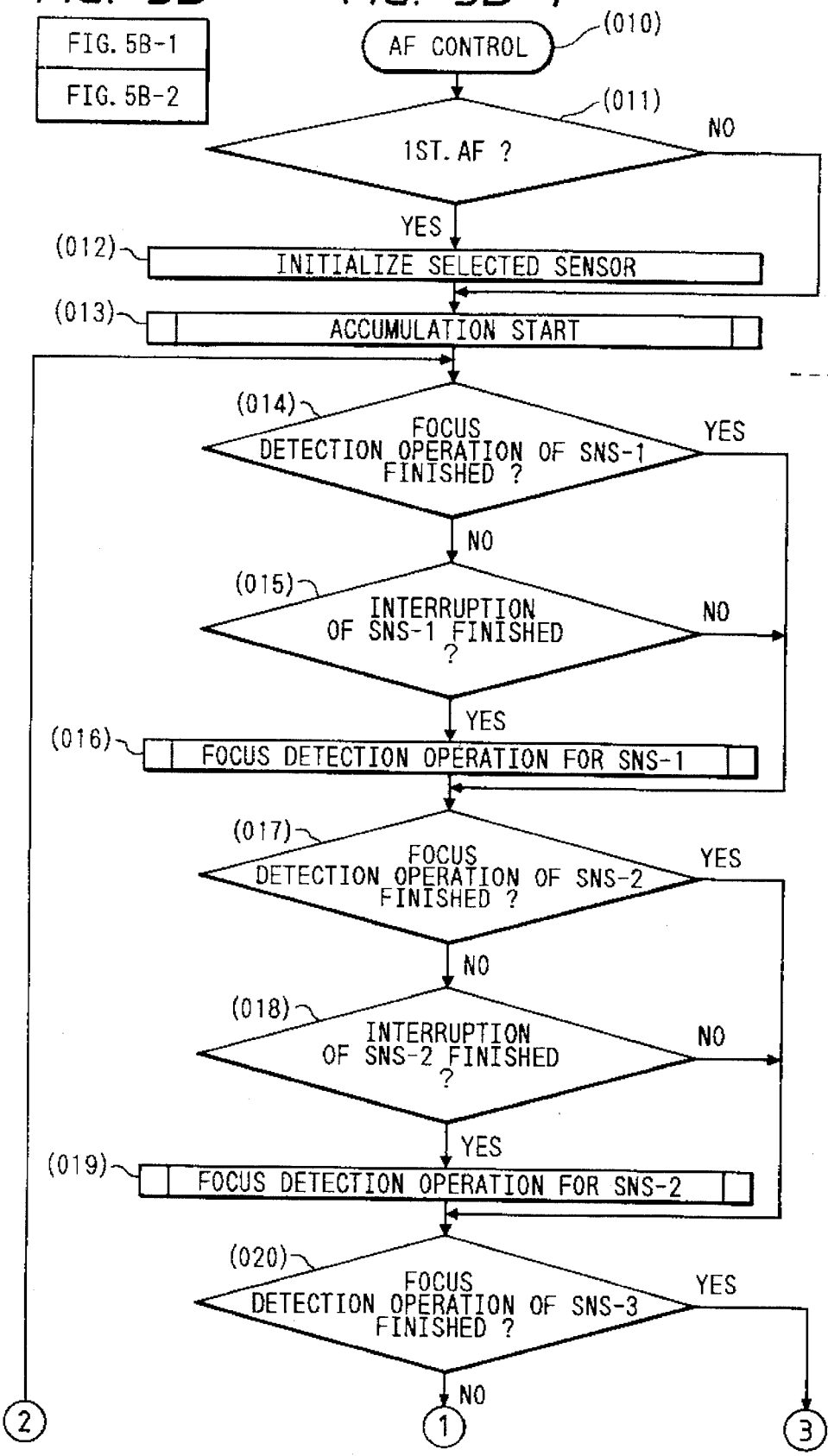

FOCUS DETECTING APPARATUS DETECTING FOCUS TO A PLURALITY OF AREAS

This application is a continuation of application Ser. No. 08/019,326 filed Feb. 12, 1993, abandoned, which is a continuation of application Ser. No. 07/610,575 filed Nov. 8, 1990, abandoned.

BACKGROUND OF THE INVENTION

1. Field of the Invention

This invention relates to a focus detecting apparatus for detecting the focus adjusted state of an object image formed by an objective, lens and to a camera containing such apparatus therein and to which the objective lens is removably mountable or secured.

This invention further relates to a focus detecting apparatus provided with defocus amount detecting means for repetitively detecting the defocus amounts of a plurality of object areas, operating means for starting the defocus amount detecting operation of said defocus amount detecting means, and selecting means for selecting at least one of said plurality of object areas.

2. Related Background Art

As a focus detecting apparatus in a camera, there is well known a method whereby light beams from an object area passed through different exit pupil areas of a photo-taking lens are imaged on a pair of line sensors and the amount of displacement of the relative position of a pair of image signals obtained by photoelectrically converting the object image is found to thereby detect the defocus amount of the object area.

This method uses one set of focus detecting systems (optical systems and sensors) and therefore can detect only the defocus amount of one object area, but there have been proposed a number of methods of detecting the defocus amounts of a plurality of object areas by preparing a plurality of sets of detecting systems.

In the latter method, there are a plurality of object areas and therefore, there are a plurality of defocus amounts detected. However, the object area on which it is desired to focus the camera is one or two at greatest (in this case, for example, the information intermediate of the two is used for focus adjustment) and therefore, it is necessary to select an object area under some judgement condition and effect the focusing of the photo-taking lens in accordance with a defocus amount corresponding to the selected area.

A popular selection method is a method of selecting the object area closest to the camera.

However, in the selection method as described above, the object area is reselected each time focus detection is repetitively effected and therefore, there occurs the following inconvenience when a photo-taking lens of the rear focus type (in which the angle of field varies appreciably when focusing is effected) is mounted on the camera.

Let it be assumed, for example, as a result of the focus detection at a certain focus position, an object in a marginal area is selected and focus adjustment is effected on the basis of the defocus amount of that area. In the lens of the rear focus type, the image in the marginal field of view varies greatly when the focus is changed and therefore, when the process is repeated in the second focus detection at a new focus position, another object area is now selected and focus adjustment is effected on the basis of the defocus amount of that area, and in some cases, oscillation in the focus adjusting operation of the photo-taking lens may result.

In the selection method as previously described, the selected area is not changed even when the object varies and the object area being selected is no longer the closest object. Conversely, if an attempt is made not to hold the selected area, the focus adjusting operation of the photo-taking lens will become oscillated as previously mentioned, and this is very inconvenient. Or there is the inconvenience wherein focus detection will become impossible if the object disappears from the object area being selected or an object having no contrast comes into the object area being selected while focus detection is repetitively effected.

SUMMARY OF THE INVENTION

It is an object of the present invention to provide an apparatus in which the detecting operation is performed with the focus adjusted state repeated and the occurrence of erroneous detection is mitigated.

It is another object of the present invention to provide an apparatus in which focus detection is effected for objects in a plurality of areas of a scene.

It is still another object of the present invention to provide a focus detecting apparatus which can prevent the focus adjusting operation of a photo-taking lens from being improperly performed and causing an oscillating operation.

It is yet still another object of the present invention to provide a focus detecting apparatus which can effect a smooth focus detecting operation even after the focal length of a photo-taking lens is varied.

BRIEF DESCRIPTION OF THE DRAWINGS

FIG. 4 schematically shows the construction of a camera including the optical system shown in FIG. 3.

FIGS. 5A, 5B, 5B-1, 5B-2 and 5C are flow charts showing the general operation in the first embodiment of the present invention.

DESCRIPTION OF THE PREFERRED EMBODIMENTS

Figure 1:
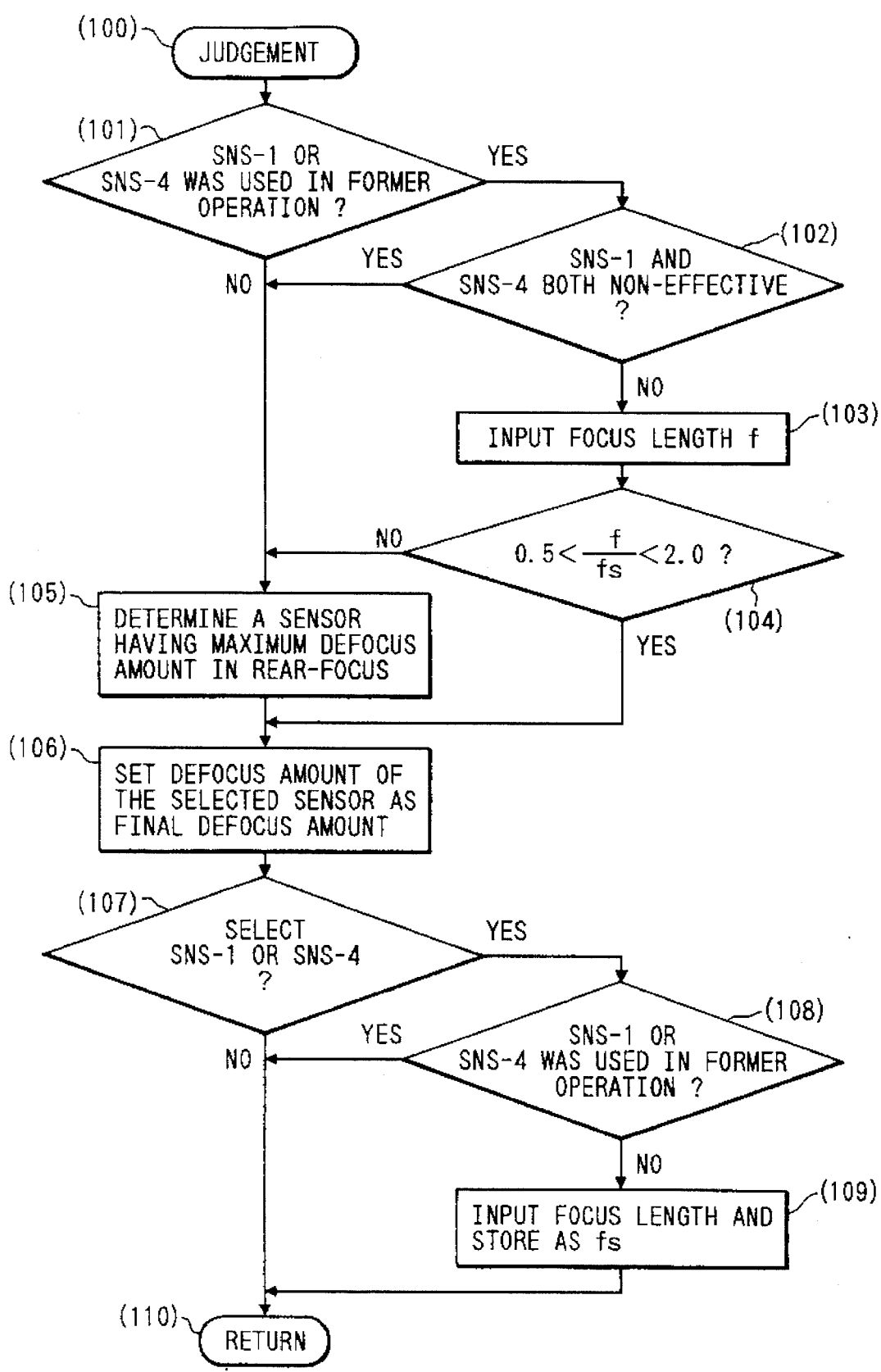
FIG. 1 is a flow chart showing the operations of the essential portions of a first embodiment of the present invention.

The present invention will hereinafter be described in detail with respect to some embodiments thereof shown in the drawings.

Figure 3:
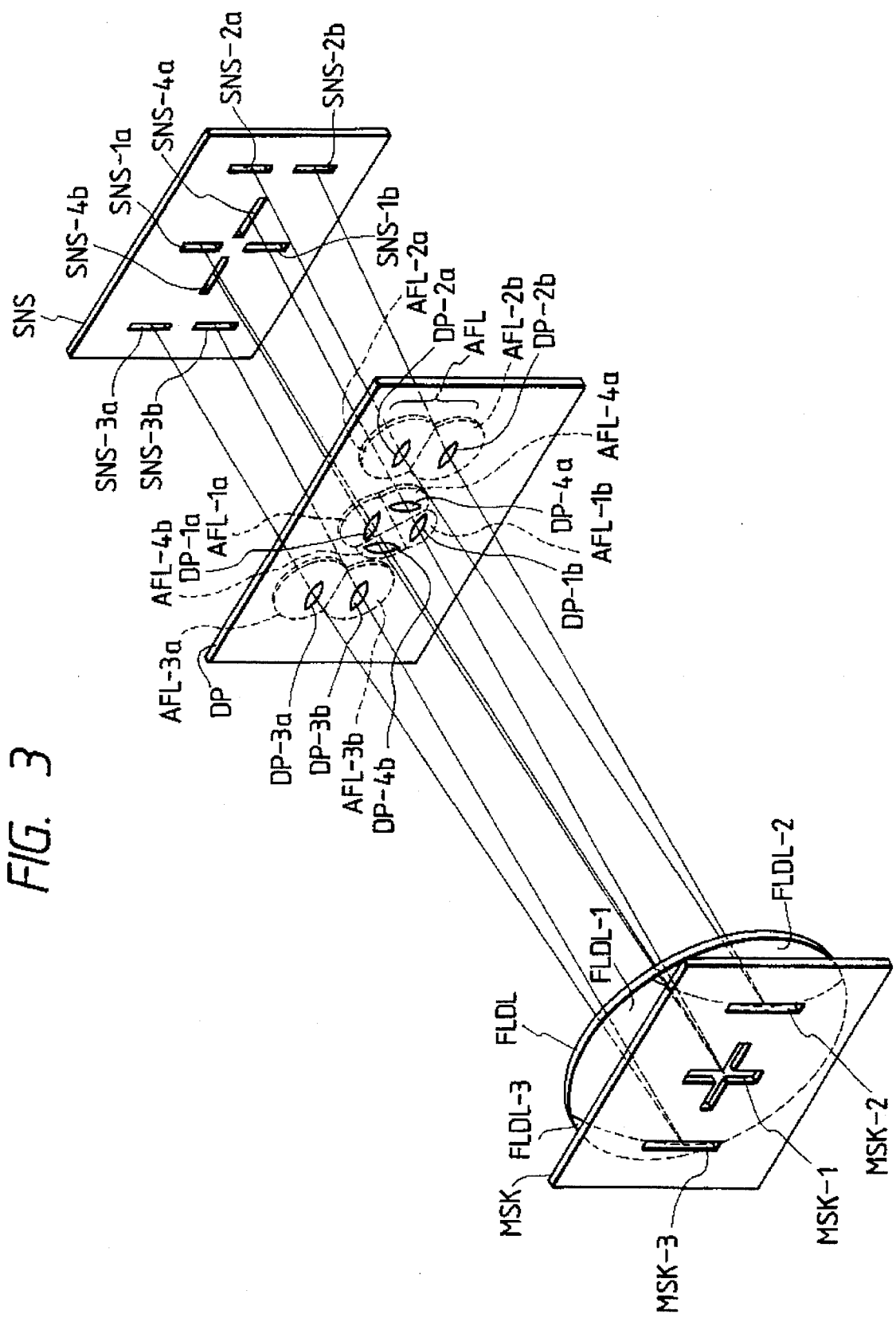
FIG. 3 shows the details of the focus optical system of the apparatus shown in FIG. 2.

FIG. 3 schematically shows the construction of a focus detecting apparatus which is an embodiment of the present invention.

In FIG. 3, MSK designates a field mask having a cruciform opening MSK-1 at the center thereof and vertically long openings MSK-2 and MSK-3 in the opposite marginal portions thereof. FLDL denotes a field lens comprising three portions FLDL-1, FLDL-2 and FLDL-3 corresponding to the three openings MSK-1, MSK-2 and MSK-3 in the field mask. DP designates a diaphragm having two vertical and horizontal pairs of openings DP-1a, DP-1b and DP-1c, DP-1d formed in the central portion thereof and two pairs of openings DP-2a, DP-2b and DP-3a, DP-3b formed in the right and left marginal portions thereof. The areas FLDL-1, FLDL-2 and FLDL-3 of the field lens FLDL have the function of imaging these pairs of openings DP-1, DP-2 and DP-3 near the exit pupil of an objective lens, not shown. AFL denotes a secondary imaging lens comprising four pairs of lenses AFL-1a, AFL-1b, AFL-4a, AFL-4b, AFL-2a, AFL-2b, AFL-3a and AFL-3b disposed rearwardly of the diaphragm DP correspondingly to the respective openings therein. SNS designates a sensor comprising four pairs of sensor arrays SNS-1a, SNS-1b, SNS-4a, SNS-4b, SNS-2a, SNS-2b, SNS-3a and SNS-3b disposed so as to receive the images of the respective secondary imaging lenses AFL correspondingly thereto.

In the focus detecting system shown in FIG. 3, when the focus of a photo-taking lens lies forwardly of the film plane, the object images formed on the pairs of sensor arrays are close to one another, and when the focus lies rearwardly of the film plane, the object images are far from one another. The amount of displacement of the relative position of these object images is in a particular functional relation with the amount of out-of-focus of the photo-taking lens and therefore, if suitable calculations are effected by each pair of sensor arrays for the sensor outputs thereof, the amount of out-of-focus, i.e., the defocus amount, of the photo-taking lens can be detected.

By adopting the construction as described above, it becomes possible to measure distance even for an object in which the distribution of the quantity of light varies only in one of the vertical direction and the horizontal direction near the center of the range photographed or observed through an objective lens, not shown, and it is also possible to measure distance for objects lying at locations corresponding to the marginal openings MSK-2 and MSK-3 in the field mask other than the center thereof.

FIG. 4 shows the arrangement when the focus detecting apparatus having the focus detecting system of FIG. 3 is contained in a camera.

In FIG. 4, LNS designates a photo-taking lens (in which one of lens units movable for zooming) is focused or which is provided with a lens portion more adjacent to the object side than to a focusing lens unit, QRM denotes a quick return mirror, FSCR designates a focusing screen, PP denotes a penta prism, EPL designates an eyepiece, FPLN denotes a film plane, SM designates a sub-mirror, MSK denotes a field mask, ICF designates an infrared cut filter, FLDL denotes a field lens, RM1 and RM2 designate first and second reflecting mirrors, SHMSK denotes a light intercepting mask, DP designates a diaphragm, AFL denotes a secondary imaging lens, AFP designates a prism member having a reflecting surface AFP-1 and an exit surface AFP-2, and SNS denotes a sensor having cover glass SNSCG and a light receiving surface SNSPLN.

The prism member AFP has the reflecting surface AFP-1 on which metal reflecting film such as aluminum is deposited by evaporation, and has the function of reflecting the light beam from the secondary imaging lens AFL and deflecting it to the exit surface AFP-2.

Figure 2:
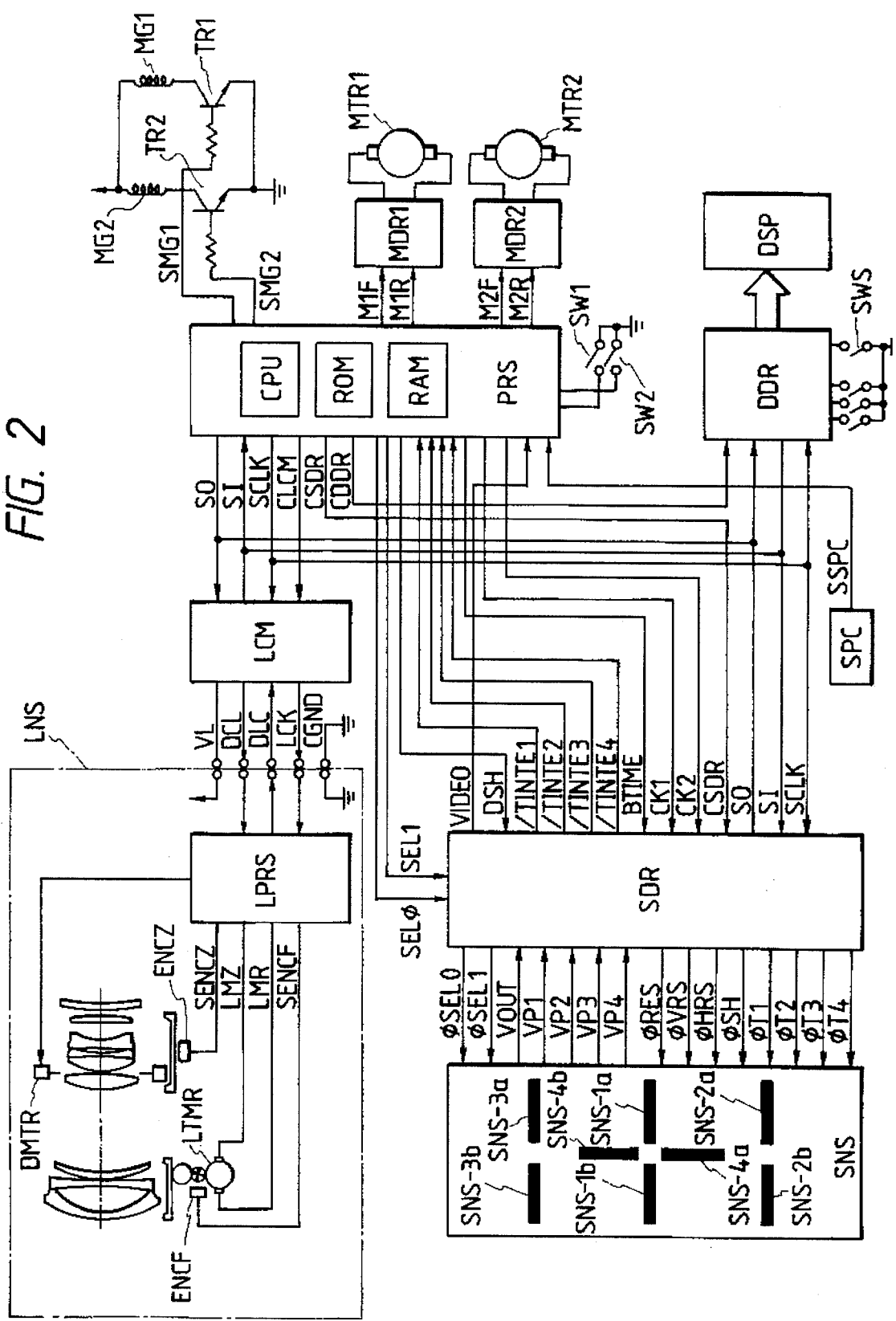
FIG. 2 shows an optical system which is a specific example of the construction when the apparatus of the present invention is incorporated into a camera, and also shows an electrical block diagram.

FIG. 2 is a circuit diagram showing a specific example of the construction of a camera provided with the focus detecting apparatus as shown in FIGS. 3 and 4, and the construction of each portion thereof will first be described.

In FIG. 2, PRS designates the controller of the camera which is, for example, a 1-chip microcomputer having therein a CPU (central processing unit), ROM, RAM and A/D converting functions. The microcomputer PRS performs a series of operations of the camera such as an automatic exposure controlling function, an automatic focus adjusting function, and winding-up and rewinding of film in accordance with the sequence program of the camera stored in the ROM. For that purpose, the microcomputer PRS uses communication signals SO, SI, SCLK and communication selection signals CLCM, CSDR, CDDR to effect communications with the surrounding circuits in the camera body and the control device in the lens to thereby control the operations of the circuits and the lens.

SO is a data signal output from the microcomputer PRS, SI is a data signal input to the microcomputer PRS, and SCLK is the synchronous clock of the signals SO and SI.

LCM designates a lens communication buffer circuit which supplies electric power to a power source terminal VL for the lens when the camera is operating, and provides a communication buffer between the camera and the lens when the selection signal CLCM from the microcomputer PRS is at a high potential level (hereinafter referred to as "H", and a low potential level will hereinafter be referred to as "L").

When the microcomputer PRS sets the selection signal CLCM to "H" and delivers predetermined data as the signal SO in synchronism with SCLK, the buffer circuit LCM outputs buffer signals LCK and DCL for SCLK and SO through the communication contact between the camera and the lens. Simultaneously therewith, the buffer circuit outputs a buffer signal for the signal DLC from the lens LNS as the signal SI, and the microcomputer PRS inputs the signal SI as the data of the lens in synchronism with SCLK.

DDR denotes a switch detecting and displaying circuit which is selected when the signal CDDR is "H", and is controlled from the microcomputer PRS by the use of SO, SI and SCLK. That is, the circuit DDR changes over the display of the display member DSP of the camera on the basis of data sent thereto from the microcomputer PRS, and informs the microcomputer PRS of the ON or OFF state of the various operating members of the camera by communication.

SW1 and SW2 designate switches operatively associated with a release button, not shown. The switch SW1 is adapted to be closed by the first-stage depression of the release button, and the switch SW2 is adapted to be closed by the second-stage depression of the release button. The microcomputer PRS effects photometry and automatic focus adjustment upon closing of the switch SW1, and effects exposure control and the winding-up of the film thereafter with the closing of the switch SW2 as a trigger.

The switch SW2 is connected to the "interruption input terminal" of the microcomputer PRS, and interruption is applied by the closing of the switch SW2 even when the program is being executed during the closing of the switch SW1 is being executed, whereby control can be immediately shifted to a predetermined interruption program.

MTR1 designates a film feeding motor, and MTR2 denotes a mirror up and down and shutter spring charging motor. The control of the forward rotation and the reverse rotation of these motors is effected by their respective driving circuits MDR1 and MDR2. Signals, M1F, M1R, M2F and M2R input from the microcomputer PRS to the driving circuits MDR1 and MDR2 are motor controlling signals.

MG1 and MG2 denote magnets for starting the movement of forward and rearward shutter curtains, respectively, and these magnets are electrically energized by signals SMG1, SMG2 and amplifying transistors TR1, TR2, and shutter control is effected by the microcomputer PRS.

The switch detecting and displaying circuit DDR, the motor driving circuits MDR1, MDR2 and shutter control are not directly concerned with the present invention and therefore need not be described in detail.

LPRS designates a control circuit in the lens, and a signal DCL input to this circuit LPRS in synchronism with LCK is the data of a command from the camera to the photo-taking lens LNS, and the operation of the lens in response to the command is predetermined. The control circuit LPRS analyzes that command in accordance with a predetermined procedure, and performs the operation of focus adjustment and aperture control, and the outputting of the operational situations of various portions of the lens (such as the driving situation of the focus adjusting optical system and the driven state of a diaphragm) and various parameters (such as the fully open F-number, the focal length, and the coefficient of the defocus amount vs. the amount of movement of the focus adjusting optical system) from an output DLC.

An example of a zoom lens is shown in the present embodiment, and when a command for focus adjustment is sent from the camera, a focus adjusting motor LTMR is driven by signals LMF and LMR in accordance with the amount and direction of driving sent at the same time to move the focus adjusting optical system in the direction of the optic axis, thereby effecting focus adjustment. The amount of movement of the optical system is determined by detecting the pattern of a pulse plate rotated in operative association with the optical system by a photo coupler, monitoring it by the pulse signal SENCF of an encoder circuit ENCF which outputs a number of pulses conforming to the amount of movement, and counting it by a counter in the circuit LPRS. At a point of time whereat the count value coincides with the amount of movement sent to the circuit LPRS, the circuit LPRS itself sets signals LMF and LMR to "L" and controls a motor LMTR.

Therefore, it is not at all necessary for the microcomputer PRS (which is the controller of the camera) to be concerned in the driving of the lens from after the command for focus adjustment is once sent from the camera until the driving of the lens is terminated. Also, the design is such that when there is a demand from the camera, it is possible to deliver the content of said counter to the camera.

When a command for aperture control is sent from the camera, a stepping motor DMTR (conventional as a motor for diaphragm driving) is driven in accordance with the number of aperture steps sent at the same time. The stepping motor is capable of open control and therefore does not require an encoder for monitoring the operation thereof.

ENCZ denotes an encoder circuit annexed to a zoom optical system, and the circuit LPRS receives as an input the signal SENCZ from the encoder circuit ENCZ and detects the zoom positions. A lens parameter in each zoom position is stored in the control circuit LPRS, which thus delivers to the camera a parameter conforming to the current zoom position when there is a demand from the microcomputer PRS of the camera.

SPC designates a photometry sensor for exposure control which receives the light from an object passed through the photo-taking lens, and the output SSPC thereof is input to the analog input terminal of the microcomputer PRS and is A/D-converted, whereafter it is used for automatic exposure control in accordance with a predetermined program.

SDR denotes a driving circuit for the focus detecting line sensor device SNS. The driving circuit SDR is selected when a signal CSDR is "H", and is controlled from the microcomputer PRS by the use of SO, SI and SCLK.

Signals $\phi$SEL0 and $\phi$SEL1 supplied from the driving circuit SDR to the sensor device SNS are signals SEL0 and SEL1 from the microcomputer PRS, and when $\phi$SEL0="L" and $\phi$SEL1="L", the pair of sensor arrays SNS-1 (SNS-1$a$ and SNS-1$b$) is selected, and when $\phi$SEL0="H" and $\phi$SEL1="L", the pair of sensor arrays SNS-4 (SNS-4$a$ and SNS-4$b$) is selected, and when $\phi$SEL0="L" and $\phi$SEL1="H", the pair of sensor arrays SNS-2 (SNS-2$a$ and SNS-2$b$) is selected, and when $\phi$SEL0="H" and $\phi$SEL1="H", the pair of sensor array SNS-3 (SNS-3$a$ and SNS-3$b$) is selected.

After the termination of accumulation, SEL0 and SEL1 are suitably set, and then clocks $\phi$SH and $\phi$HRS are sent, whereby the image signals of the pair of sensor arrays selected by SEL0 and SEL1 ($\phi$SEL0 and $\phi$SEL1) are serially output from an output VOUT.

VP1, VP2, VP3 and VP4 are monitor signals from object luminance monitoring sensors disposed near the pairs of sensor arrays SNS-1 (SNS-1$a$ and SNS-1$b$), SNS-2 (SNS-2$a$ and SNS-2$b$), SNS-3 (SNS-3$a$ and SNS-3$b$) and SNS-4 (SNS-4$a$ and SNS-4$b$), and the voltages thereof rise with the start of accumulation, whereby the accumulation control of the pairs of sensor arrays is effected.

Signals $\phi$RES and $\phi$VRS are sensor resetting clocks, $\phi$HRS and $\phi$SH are clocks for reading out image signals, and $\phi$T1, $\phi$T2, $\phi$T3 and $\phi$T4 are clocks for terminating the accumulation in the respective pairs of sensor arrays.

The output VIDEO of a sensor driving circuit SDR is an image signal amplified by the again-determined luminance of the object after the difference between the image signal VOUT from the sensor device SNS and a dark current output is taken. The abovementioned dark current output is the output value of a picture element in the sensor arrays which has been shield from light, and the sensor driving circuit SDR holds its output in a capacitor by a signal DSH from the microcomputer PRS, and effects the amplification of the differential between it and the image signal. The output VIDEO is input to the analog input terminal of the microcomputer PRS, and the microcomputer PRS A/D-converts the same signal, whereafter it successively stores the digital value thereof into predetermined addresses in the RAM.

Signals /TINTE1, /TINTE2, /TINTE3 and /TINTE4 are signals which become proper by charges accumulated in the pairs of sensor arrays SNS-1 (SNS-1$a$ and SNS-1$b$), SNS-2 (SNS-2$a$ and SNS-2$b$), SNS-3 (SNS-3$a$ and SNS-3$b$) and SNS-4 (SNS-4$a$ and SNS-4$b$) and which are indicative of the termination of the accumulation, and in response thereto, the microcomputer PRS executes the reading-out of the image signal.

A signal BTIME is a signal which provides the timing for determining the reading-out gain of an image signal amplifier in the sensor driving circuit SDR, and usually, the circuit SDR determines the read-out gain of the corresponding pair of sensor arrays from the voltages of monitor signals VP0–VP3 at a point of time whereat the signal BTIME assumes "H".

CK1 and CK2 are reference clocks given from the microcomputer PRS to the sensor driving circuit SDR to produce the aforementioned clocks $\phi$RES, $\phi$VRS, $\phi$HRS and $\phi$SH.

By the microcomputer PRS setting the communication selection signal CSDR to "H" and delivering a predetermined "accumulation starting command" to the sensor driving circuit SDR, the accumulating operation of the sensor device SNS is started.

Thereby, the photoelectric conversion of the object images formed on the sensors by the four pairs of sensor arrays is effected and charges are accumulated in the photoelectric converting element portions of the sensors. At the same time, the signals VP1–VP4 of the luminance monitoring sensors rise, and when this voltage reaches a predetermined level, the aforementioned signals /TINTE1–/TINTE4 assume "L" independently of one another.

In response to this, the microcomputer PRS outputs a predetermined waveform to the clock CK2. The sensor driving circuit SDR produces clocks φSH and φHRS on the basis of CK2 and gives it to the sensor device SNS, which in turn outputs an image signal by said clock, and the microcomputer PRS A/D-converts the output VIDEO input to the analog input terminal thereof by the A/D converting function therein in synchronism with CK2 which is output by the microcomputer itself, whereafter it successively stores the digital signal into the predetermined addresses in the RAM.

The operations of the sensor driving circuit SDR and the sensor device SNS have been previously disclosed in the U.S. patent application Ser. No. 400,923 filed on Aug. 30, 1989, (abandoned) as a focus detecting apparatus having two pairs of sensor arrays and therefore need not be described in detail herein.

In the manner described above, the microcomputer PRS receives the image information of the object images formed on the pairs of sensor arrays and thereafter performs a predetermined focus detection operation and can know the defocus amount of the photo-taking lens.

The automatic focusing adjusting apparatus of the camera having the above-described construction will now be described with reference to the following flow charts.

Figure 5A:
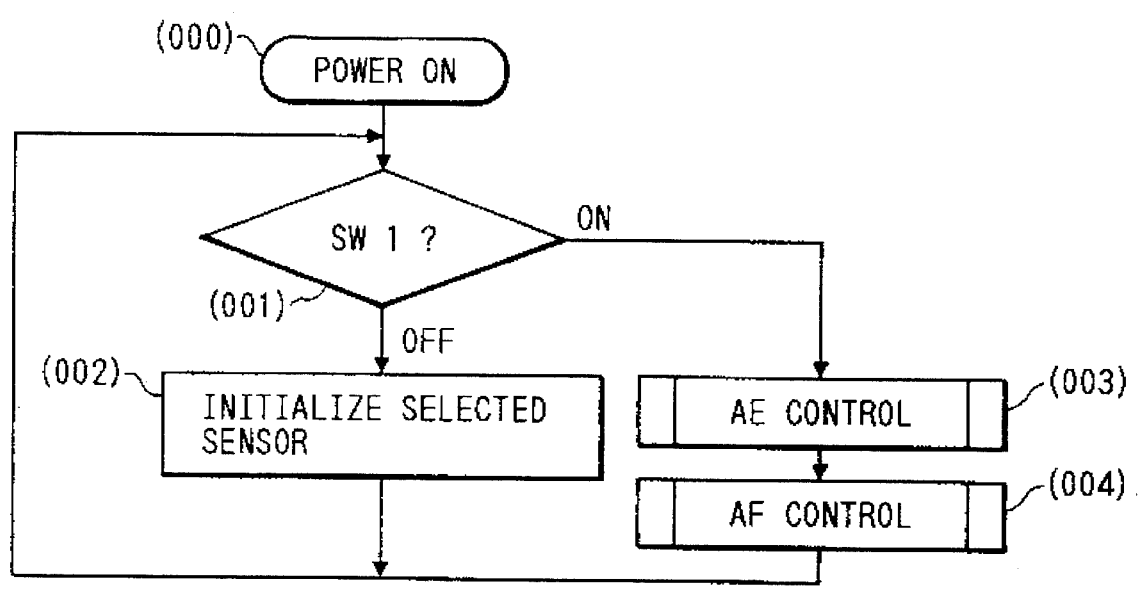

FIG. 5A is a very rough flow chart of the sequence of the entire camera.

When the supply of electric power to the circuit shown in FIG. 2 is started, the microcomputer PRS starts execution from the step (000) of FIG. 5A. At a step (001), the state of the switch SW1 adapted to be closed by the first-stage depression of the release button is detected, and if the switch SW1 is OFF, a shift is made to a step (002), where the selected sensor is initialized. If the switch SW1 is ON, a shift is made to a step (003), where the operation of the camera is started.

At the step (003), the "AE control" subroutine including photometry, the detection and display of the states of various switches, etc. is executed. The AE control is not directly concerned with the present invention and therefore need not be described in detail. When the "AE control" subroutine is terminated, a shift is made to a step (004).

At the step (004), the "AF control" subroutine is executed. At this step, the accumulation in the sensors, the focus detection operation and the automatic focus adjusting operation of lens driving are effected. When the "AP control" subroutine is terminated, a return is made to the step (001), and the steps (003) and (004) are repetitively executed until the power source becomes OFF.

In the flow chart of the present embodiment, the release operation is not described because it is not directly concerned with the present invention.

Figures 2, 5B:
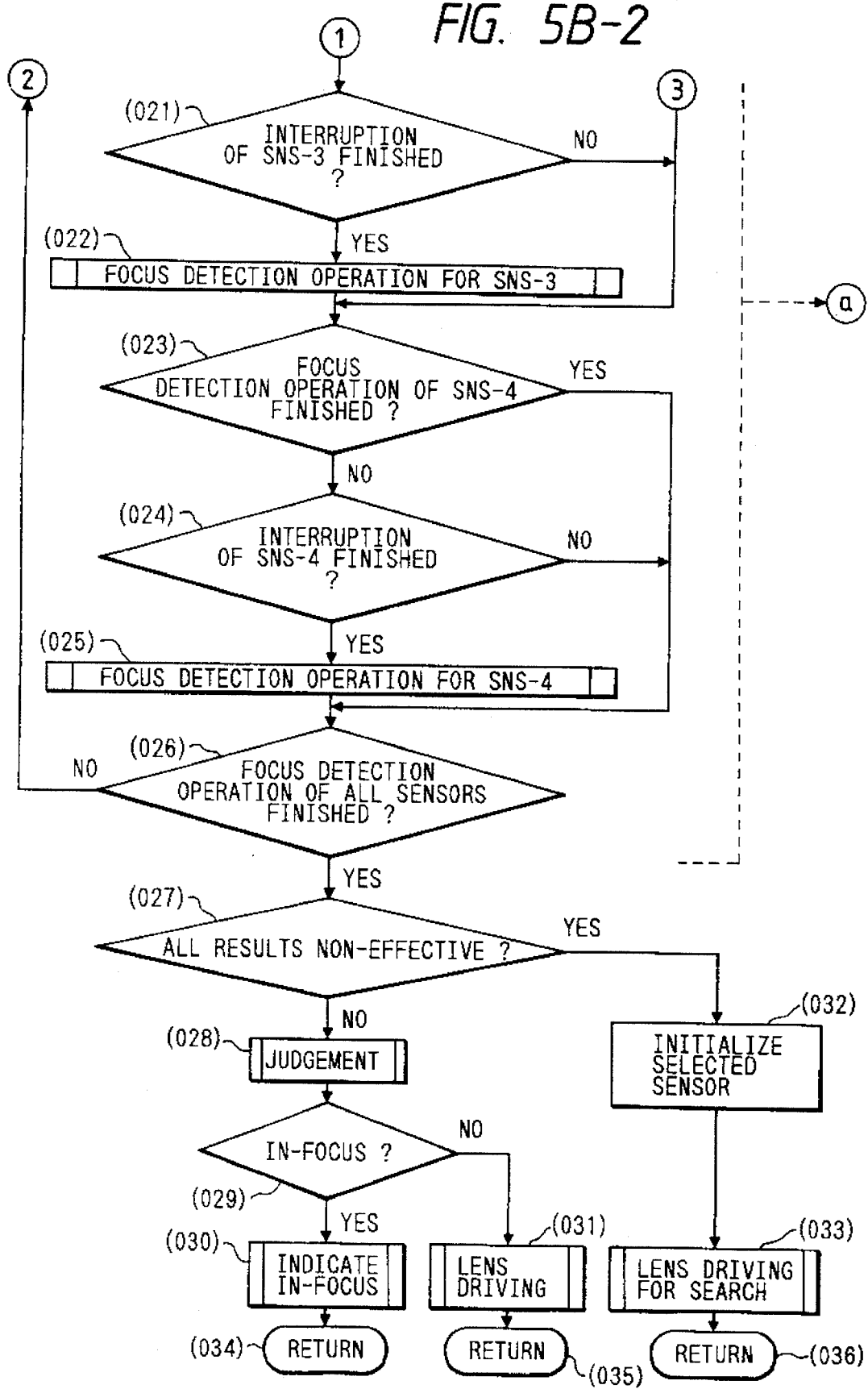

FIG. 5B is a flow chart of the "AF control" subroutine executed at the aforementioned step (004).

When the "AF control" subroutine is called, the AF control of a step (011) and subsequent steps are executed via a step (010).

First, at the step (011), the switch SW1 is closed and whether the current AF control is the first AF control is discriminated, and if it is the first AF control, a shift is made to a step (012), where the selected sensor is initialized.

Then, at a step (013), the "accumulation start" subroutine is executed. This subroutine is a routine for starting the accumulating operation of the sensors, and more specifically, it is a subroutine for permitting the interruption function so that an accumulation starting command may be delivered to the sensor driving circuit SDR to thereby start the accumulating operation of the sensor device SNS and at the same time, the microcomputer PRS can execute "accumulation completion interruption" by the sensor accumulation completion signals /TINTE1–/TINTE3 from the circuit SDR. Thus, each accumulation completion interruption is executed at a point of time whereat the four sensors SNS-1 to SNS-3 have completed accumulation.

The accumulation completion of the sensors can be detected by the falling of the signals /TINTE1–/TINTE3, which are connected to the "interruption function input terminal" of the microcomputer PRS. In FIG. 5B, the broken line ⓐ represents the interruption control, and when the interruption by the signals /TINTE1–/TINTE3 occurs, control shifts to each interruption routine shown in FIG. 5C, through ⓐ in FIG. 5B. Accordingly, if the charge accumulation, for example, in the sensor SNS-1 becomes proper and the signal /TINTE1 from the sensor driving circuit SDR falls, a shift can be made to the interruption routine of the step (050) and subsequent steps of FIG. 5C in response thereto.

Figure 5C:
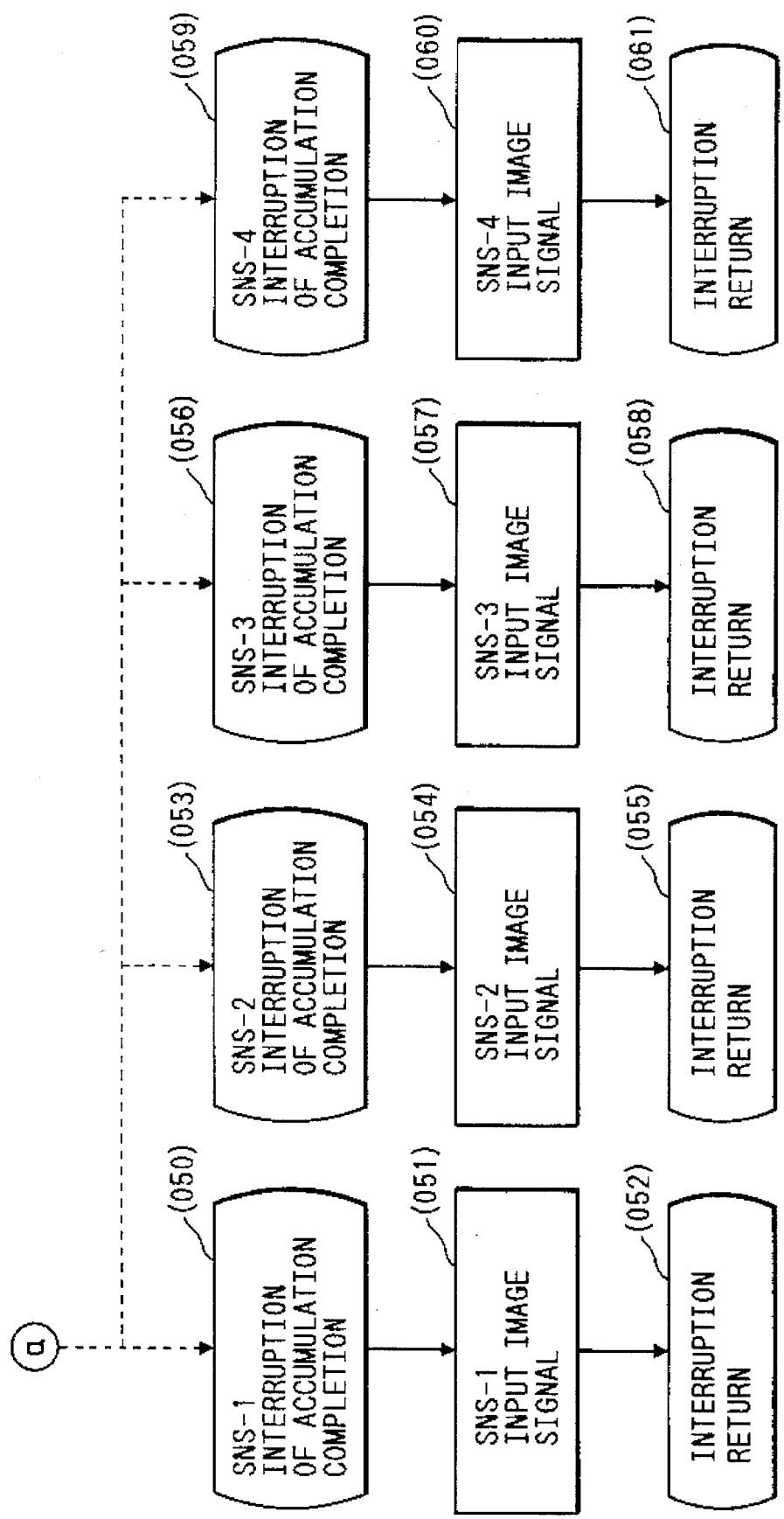

The interruption routine of the step (050) and subsequent steps of FIG. 5C is a routine for inputting the image signal of the sensor SNS-1.

After the image signal of the sensor SNS-1 is input at a step (051), the interruption routine is returned at a step (052). The inputting of the image signal is accomplished by serially A/D-converting the output VIDEO input to the analog input terminal of the microcomputer PRS, and storing the digital data thereof into predetermined RAM areas in succession.

When the accumulation in the sensors SNS-2, SNS-3 and SNS-4 are completed, a shift is likewise made to the steps (053), (056) and (059) of FIG. 5C under interruption control, and the image signal inputting of each sensor is effected.

The "accumulation start" subroutine and a specific method of image signal inputting are disclosed by the assignee of the subject application in the U.S. patent application Ser. No. 400,923 filed on Aug. 30, 1989, etc. and therefore need not be described in detail herein.

Turning back to FIG. 5B, the description will be continued.

The image signal inputting process of each sensor is under interruption control and thus, is preferentially carried out as occasion calls at the point of time of accumulation completion during the execution of the focus detection operation, etc. of the steps (014)–(026) of FIG. 5B.

Now, when the accumulating operation of the sensors is started at the step (013), a shift is made to the step (014).

At the step (014), whether the focus detection operation of the sensor SNS-1 has been completed is judged, and if it is not completed, a shift is made to the step (015).

At the step (015), whether the image signal inputting of the sensor SNS-1 has already completed the interruption process is judged, and if it has completed the interruption process, a shift is made to the step (016), where the focus detection operation based on the image signal of the sensor SNS-1 is executed. A specific operation method for the detection of the defocus amount is disclosed in U.S. Pat. No. 4,812,869 by the assignee of the subject application and therefore need not be described in detail herein.

If the focus detection operation of the sensor SNS-1 is not completed at the step (014) or if the inputting of the image signal of the sensor SNS-1 is not completed at the step (015), or after the focus detection operation for the sensor SNS-1 is completed at the step (016), a shift is made to the step (017).

At the steps (017), (018) and (019), the above-described process is carried out for the sensor SNS-2.

Further, at the steps (020), (021) and (022), the above-described process is carried out for the sensor SNS-3, and at the steps (023), (024) and (025), the above-described process is carried out for the sensor SNS-4.

At the step (026), whether the focus detection operation corresponding to all sensors has been completed is judged, and if it is not completed, a shift is made to the step (014), and if it is all completed, a shift is made to a step (027).

Summing up what has hitherto been described, after the accumulating operation has been started at the step (013), the steps (014)–(026) are repetitively executed while waiting for the image signal of each sensor to be read in by the interruption process, and a focus detection operation is performed in succession from the sensor from which the image signal has been read.

When the focus detection operation for all sensors is completed, whether the result of the focus detection for all sensors is effective or ineffective is examined at the step (027). That is, whether the result of the detection for each sensor is effective or ineffective is determined by the measure of the contrast and the degree of coincidence of the image signals found at a time in the process of focus detection operation, and if the result of the detection for all sensors is ineffective and the detection of defocus is impossible, a shift is made to a step (032).

At the step (032), the selected sensor is initialized, and a shift is made to a step (033).

At the step (033), the "lens driving for search" subroutine is executed. This is the procedure for estimating the rise of the contrast of the object while driving the lens when the contrast is low, and is disclosed in detail in the aforementioned the U.S. Pat. No. 4,812,869, etc.

If at the step (027), the detection of defocus is possible by at least one sensor, the "judgement" subroutine is executed at a step (028).

The "judgement" subroutine is a routine for selecting the sensor which provides for the defocus amount as the final result, and the flow chart thereof is shown in FIG. 1.

When the "judgement" subroutine is called, a shift is made to a step (101) via a step (100).

At the step (101), whether the sensor selected in the last AF control was SNS-1 or SNS-4 is judged, and if so, a shift is made to a step (102). The sensors SNS-1 and SNS-4 are sensors corresponding to the object in the field of central area of the view. If any other sensor than the sensors SNS-1 and SNS-4 was selected at the last time or if the selected sensor was initialized, a shift is made to a step (105).

If the sensor SNS-1 or SNS-4 was selected at the last time and a shift is made to the step (102), where whether the detection of defocus is impossible in both of the sensors SNS-1 and SNS-4 is judged. If the detection is impossible in both of these sensors, a shift is made to a step (105), and if the detection is possible in one or both of these sensors, shift is made to a step (103).

At the step (103), the focal length f of the lens is input and subsequently, at a step (104), the ratio of the focal length f to the pre-memorized focal length fs is found, and whether this ratio is within the range of "0.5–2.0" is judged. The focal length fs, as will be described later, is a focal length memorized at a point of time whereat the sensor SNS-1 or SNS-4 was selected at first during the sensor selection in the past.

If the ratio of the focal length f to the focal length fs is within the range of "0.5–2.0", that is, the variation in the focal length is less than double, a shift is made to a step (106), and if said ratio is outside said range, that is, said variation is double or greater, a shift is made to a step (105).

Said "0.5" and "2.0" are values suitable for this lens, and these values are not restrictive.

At the step (105), the sensor presenting the defocus amount of the rearmost focus is selected from among the sensors by which the detection is possible. The fact that defocus is rear focus means that the photo-taking lens is in rear focus for the object being imaged on that sensor and thus, the object corresponding to the sensor presenting the defocus of the rearmost focus is an object existing at the shortest distance relative to the camera. Thus, in the present embodiment, the focus adjusting operation of focusing the lens on the object on the closest side is performed.

At the next step (106), the defocus amount of the selected sensor is set as the final defocus amount, and a shift is made to a step (107).

At steps (107) and (108), a shift is made to a step (109) only if the sensor SNS-1 or SNS-4 has been selected for the first time in the current operation.

At the step (109), the focal length is input from the lens and stored as fs in a predetermined address in the RAM.

Finally, at a step (110), the "judgement" subroutine is returned to the AF control subroutine.

Summing up what has been described above, basically in the "judgement" subroutine, the sensor corresponding to the closest object is selected from among the sensors by which focus detection is possible, but once one of the sensors SNS-1 and SNS-4 which lies in the central area of the view has been selected, the selection of the sensor SNS-1 or SNS-4 is not altered unless both of these sensors become incapable of detection or the focal length varies greatly from the time of selection (step (101)→(102)→(104)→(106)).

Turning back to FIG. 5B, after the exectuion of the "judgement" subroutine of the step (028), at the next step (029), whether the photo-taking lens is in the in-focus state is judged on the basis of the finally obtained defocus amount. If the lens is in-focus, the "indicate in-focus" subroutine is executed at a step (030) and the in-focus state is indicated in the viewfinder, and at the next step (034), the "AF control" subroutine is returned to the main program.

If at the step (029), the lens is judged to be not in focus, a shift is made to a step (031), where lens driving is effected, and then at a step (035), a return is made to the main program. The lens driving method is disclosed in the U.S. Pat. No. 4,812,869, etc. and therefore need not be described in detail herein.

According to the present embodiment, the design is such that the defocus amount detecting operation is repetitively performed in response to the depression of the shutter release button and an appropriate object area is selected during each operation, but once the object area in the central area of the field of view is selected, this central area is continued to be selected until the release button is released and therefore, oscillation movement caused during the focus adjustment of the photo-taking lens or oscillation movement caused when said object area is selected can be prevented, and it becomes possible for accurate automatic focus adjustment to be always accomplished.

In the present embodiment, the design is such that the selected sensor is initialized upon release of the shutter release button, but this may be done by the use of a discrete operating member.

Also, as the automatic focus adjusting operation, there are known the so-called one-shot mode in which once the lens is in focus, the focus adjusting operation thereafter is not performed and the so-called servo mode in which the focus adjusting operation is executed irrespective of the in-focus state, but from the gist of the present invention, the invention may be applied only to the one-shot mode.

Figure 6A:
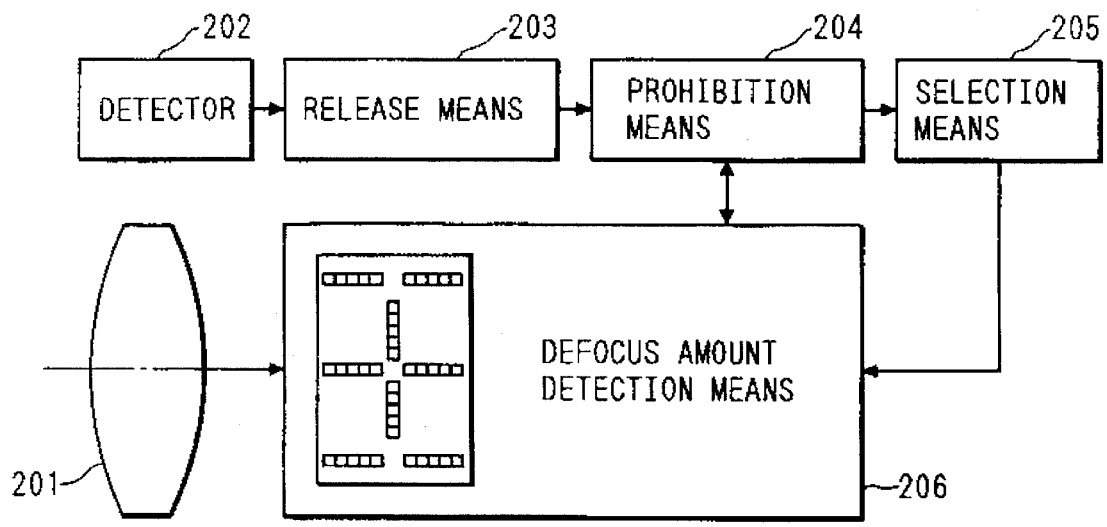
FIG. 6A is a block diagram for illustrating a second embodiment of the present invention.

Referring now to FIG. 6A which is a block diagram showing another embodiment of the present invention, the reference numeral 201 designates a photo-taking lens having a variable focal length. The reference numeral 202 denotes detector means for detecting any variation in the focal length f of the photo-taking lens 201, the reference numeral 205 designates selection means for selecting at least one area as the object area from among a plurality of object areas, the reference numeral 204 denotes prohibition means functioning to prohibit the selecting operation of said selection means 205 when the selected area is the object area at the center of the field of view, the reference numeral 203 designates release means for discriminating whether the focal length f input from the detector means 202 has been varied by a predetermined amount, and releasing the prohibiting operation of said prohibition means 204 when the focal length f has been varied by the predetermined amount, and the reference numeral 206 denotes defocus amount detection means having a plurality of pairs of sensors for detecting the defocus amounts of the plurality of object areas, and repetitively effecting the detection of the defocus amount of the object area selected by said selection means 205 and outputting the result of the detection to focus adjusting means, not shown.

Figure 6B:
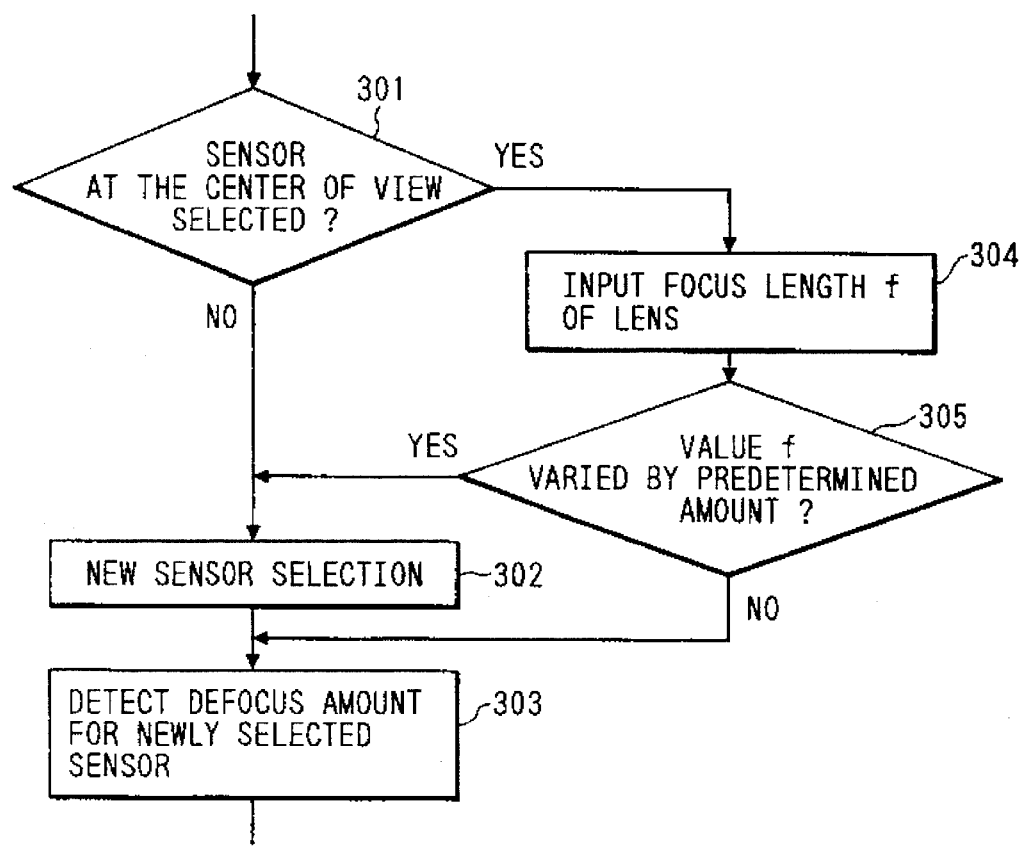
FIG. 6B is a partial flow chart.

The operation of the present embodiment will now be described with reference to the flow chart of FIG. 6B.

When the object area (sensor) at the center of field of view is selected by the selection means 205 at the last time, the prohibition means 204 progresses its operation from a step (301) to a step (304) to prohibit the new selecting operation of the selection means 205. At the step (304), the focal length f of the photo-taking lens 201 is introduced by the detector means 202, and at the next step (305), whether the difference from the last focal length information exceeds a predetermined amount is discriminated by the release means 203. If as a result, said difference does not exceeds the predetermined amount, the release means 203 causes the defocus amount detection means 206 to detect the defocus amount of the object area at the center of view, and if said difference exceeds the predetermined amount, the release means progresses its operation from the step (305) to a step (302) to release the prohibiting operation of the prohibition means and causes said selection means 205 to perform a new selecting operation (for example, the selection of the sensor representative of the defocus of the rearmost focus).

Even if as described above, the object area at the center of the field of view is once selected, when the focal length of the photo-taking lens 201 is varied by a predetermined amount, the object is no longer present in the selected object area as previously described, whereby focus detection becomes impossible or the object area which is closest becomes a discrete area, and this leads to the inconvenience that the subsequent focus adjusting operation is not executed smoothly and therefore, the design is such that a shift is made from the step (305) to the step (302) so that the object area selecting operation may be performed under a new focal length. Thus, it becomes possible for the subsequent focus adjusting operation to be performed smoothly.

Figure 7:
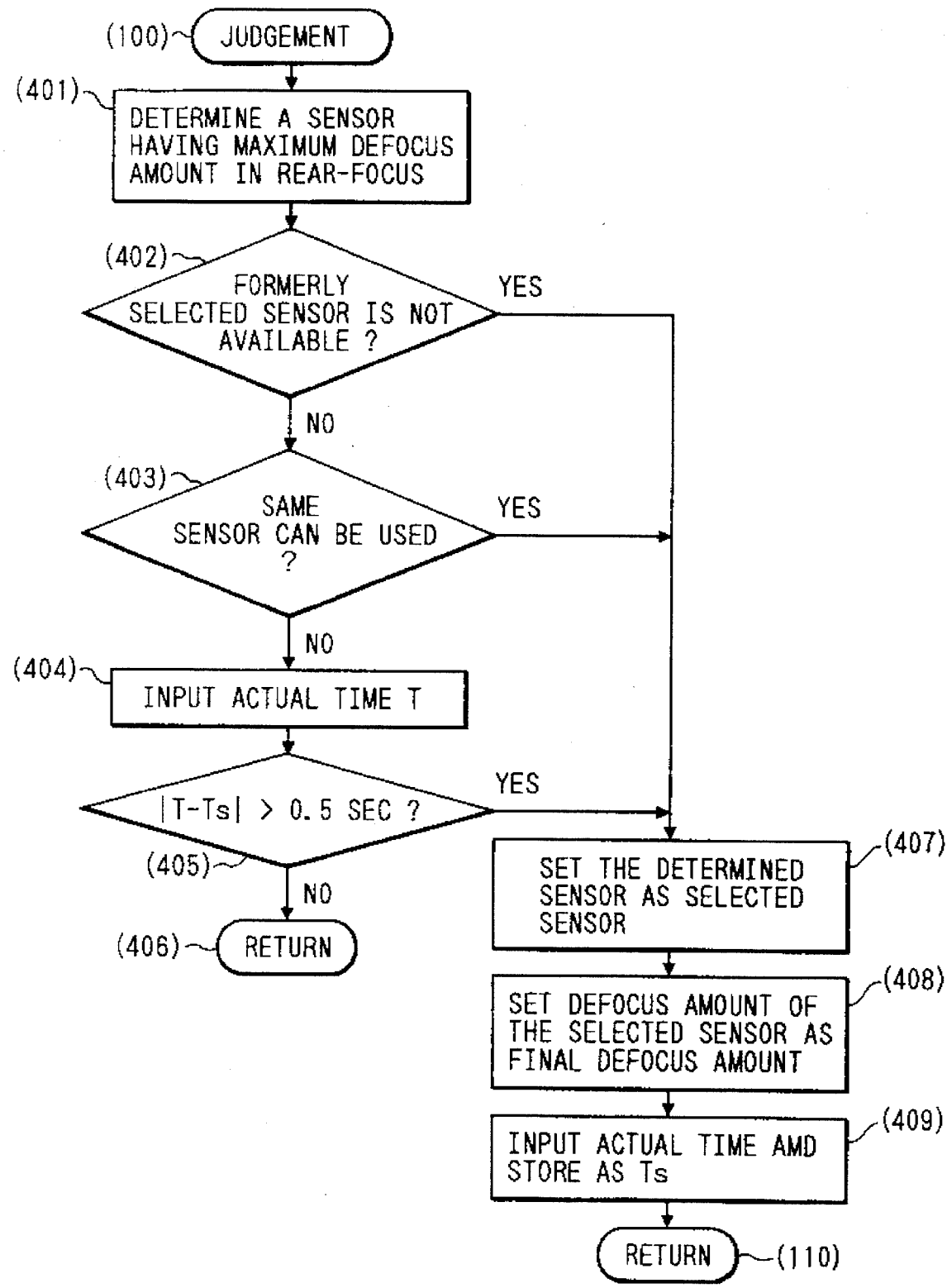
FIG. 7 is a flow chart showing the operation of a third embodiment of the present invention.

Still another embodiment of the present invention will now be described with reference to FIG. 7.

When the "judgement" subroutine is called, a shift is made to a step (401) via a step (100).

At the step (401), the sensor presenting a defocus amount of the rearmost focus is discriminated among the sensors by which detection is possible. The fact that the defocus amount is in rear focus means that the photo-taking lens is in rear focus for the object being imaged on that sensor and thus, the object corresponding to the sensor presenting the defocus amount of the rearmost focus is the object lying at the shortest distance relative to the camera. Thus, in the present embodiment, the focus adjusting operation of focusing the lens on the object on the closest side is performed.

At the next step (402), whether the sensor selected in the last AF control is capable of detection by the current focus detecting operation is examined, and if it is incapable of detection, shift is made to a step (407), and if it is capable of detection, a shift is made to a step (403).

A description will first be provided of the case where the selected sensor is capable of detection.

At the step (403), whether the sensor selected in the last AF control and the sensor judged this time are the same is examined, and if they are the same, a shift is made to a step (407).

If they are not the same, a shift is made to a step (404), where the current time T is input from a timer contained in the microcomputer PRS. Subsequently at a step (405), whether the difference between a prememorized time Ts and the time T exceeds "0.5" second in terms of actual time is judged. "0.5" second is not a restrictive value, but is an example of the time for locking the selected sensor temporarily. If said time difference is within "0.5" second, the selected sensor is not changed over and at the next step (406), the "judgement" subroutine is returned to the AF subroutine.

On the other hand, if at the step (405), the time difference is judged to exceed "0.5" second, a shift is made to a step (407). That is, "0.5" second has passed after the object area corresponding to the so-far selected sensor has no longer been closest among the object areas and therefore, the program branches off to the step (407) to change over the selected sensor.

At the step (407), the sensor determined at the step (401) is set as a new selected sensor, and then at a step (408), the defocus amount presented by the selected sensor is set as the final defocus amount.

At the next step (409), a timer value is input as the time when the selected sensor has been newly reselected, and this is stored as Ts in the RAM, and subsequently at a step (410), the "judgement" subroutine is returned to the AF subroutine.

Figure 8A:
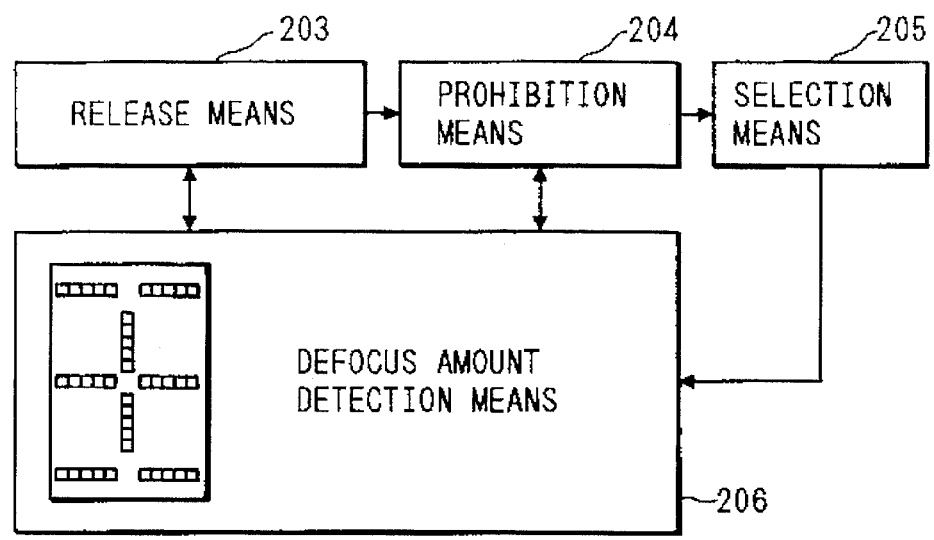
FIG. 8A is a block diagram for illustrating a fourth embodiment of the present invention.

Referring now to FIG. 8A which is a block diagram showing yet still another embodiment of the present invention, the reference numeral 205 designates selection means for selecting at least one area as the object area from among a plurality of object areas, the reference numeral 204 denotes prohibition means functioning to prohibit the selecting operation of said selection means 205 when the selected area is the object area at the center of the field of view, the reference numeral 206 designates defocus amount detection means having a plurality of pairs of sensors for detecting the defocus amounts of the plurality of object areas, and respectively effecting the detection of the defocus amount of the object area selected by said selection means 205, and the reference numeral 203 denotes release means for discriminating whether the defocus amount detected by the defocus amount detection means 206 is reliable information and releasing the prohibiting operation of said prohibition means 204 if the detected defocus amount is lacking in reliability.

Figure 8B:
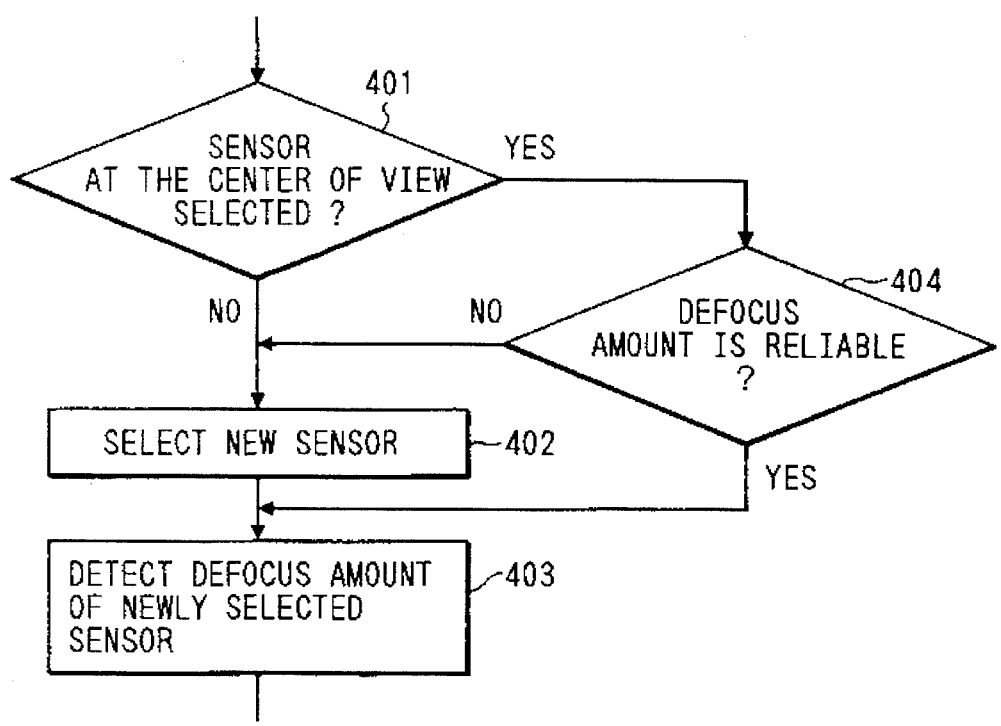
FIG. 8B is a partial flow chart.

The operation of the present embodiment will now be described with reference to the flow chart of FIG. 8B.

When the object area (sensor) at the center of the field of view is selected by the selection means 205 as at the last time, the prohibition means 204 progresses its operation from a step (401) to a step (404) to prohibit a new selecting operation of the selection means 205. At the step (404), whether the defocus amount detected by the defocus amount detection means 206 is reliable information, that is, whether focus detection is possible, is discriminated by the release means 203. If as a result, it is judged that the detected defocus amount is reliable (focus detection is possible), the release means 203 causes the defocus amount detection means 206 to detect the defocus amount of the object area at the center of the field of view, and on the other hand, if it is judged that the detected defocus amount is lacking in reliability, the release means progresses its operation from a step (405) to a step (402) to release the prohibiting operation of said prohibition means and causes said selection means 205 to perform a new selecting operation (for example, the selection of the sensor representative of the defocus of the rearmost focus).

As described above, the design is such that even if the object area at the center of the field of view is once selected, when the object is absent in the selected object area or an object having no contrast comes into the selected object area and thereby the detected defocus amount has a lessened reliability, a shift is made from the step (404) to the step (402) to thereby cause a new object area selecting operation to be performed and therefore, the subsequent focus adjusting operation can be performed properly.

I claim:

1. A focus detecting apparatus for receiving light energy passed through an objective and detecting a focus adjusted state thereof, comprising:

defocus amount detection means for repetitively detecting the defocus amounts of a plurality of areas in a field of view corresponding to the objective;

operating means for starting the defocus amount detecting operation of said defocus amount detection means;

selection means for selecting at least one of said plurality of areas;

discrimination means for discriminating whether the selected area is an area of a predetermined condition;

prohibition means for prohibiting a new selecting operation of said selection means as long as it is discriminated by said discrimination means that the selected area is an area of a predetermined condition, the previously-detected amount of defocus for the selected area being used to determine the focus adjusted state of the objective.

2. A focus detecting apparatus according to claim 1, wherein said discrimination means is means for judging the area at the center of the view as the area of a predetermined condition.

3. A focus detecting apparatus for receiving light energy passed through an objective and detecting a focus adjusted state thereof, comprising:

defocus amount detection means for repetitively detecting the defocus amounts of a plurality of areas in a field of view relating to the objective;

selection means for selecting at least one of said plurality of areas;

detection means for detecting a signal indicative of a variation in the focal length of said objective;

prohibition means for prohibiting the selecting operation of said selection means; and release means for releasing the prohibiting operation of said prohibition means when it is judged from the output from said detection means that the variation in the focal length is greater than a predetermined amount.

4. A focus detecting apparatus according to claim 3, wherein said prohibition means prohibits the operation of said selection means when a selected area is in a predetermined condition.

5. A focus detecting apparatus for receiving light energy passed through an objective and detecting the focus adjusted state, provided with:

defocus amount detection means for repetitively detecting the defocus amounts of a plurality of areas;

selection means for selecting one of said plurality of areas which conforms to a predetermined selection condition;

first discrimination means for discriminating during the repetitively performed defocus amount detecting operation whether the selected area is not against said predetermined selection condition;

second discrimination means for discriminating whether a predetermined time has passed after it has been discriminated by said first discrimination means that the selected area is against said predetermined condition; and operation control means for prohibiting the selecting operation of said selection means when it is discriminated by said first discrimination means that the selected area is not against said predetermined condition and it is discriminated by said second discrimination means that said predetermined time has not passed, and permitting a new selecting operation of said selection means when it is discriminated by said first discrimination means that the selected area is against said predetermined condition and it is discriminated by said second discrimination means that said predetermined time has passed after it has been discriminated that the selected area is against said predetermined condition.

6. A focus detecting apparatus for receiving light energy passed through an objective and detecting the focus adjusted state, provided with:

defocus amount detection means for repetitively detecting the defocus amount of a plurality of areas;

selection means for selecting one of said plurality of areas which conforms to a predetermined selection condition;

first discrimination means for discriminating during the repetitively performed defocus amount detecting operation whether the selected area is not against said predetermined condition;

second discrimination means for discriminating whether a predetermined number of times of defocus amount detecting operations have been performed after it has been discriminated by said first discrimination means that the selected area is against said predetermined condition; and operation control means for prohibiting the selecting operation of said selection means when it is discriminated by said first discrimination means that the selected area is not against said predetermined condition and it is discriminated by said second discrimination means that defocus amount detecting operations exceeding said predetermined number of times have not been performed, and permitting a new selecting operation of said selection means when it is discriminated by said first discrimination means that the selected area is against said predetermined condition and it is discriminated by said second discrimination means that defocus amount detecting operations exceeding said predetermined number of times have been performed after it has been discriminated that the selected area is against said predetermined condition.

7. A focus detecting apparatus for receiving light energy passed through an objective and detecting a focus adjusted state thereof, comprising:

defocus amount detection means for repetitively detecting the defocus amounts of a plurality of areas;

selection means for selecting at least one of said plurality of areas;

prohibition means for prohibiting a new selecting operation of said selection means, the previously-detected amount of defocus for the selected area being used to determine the focus adjusted state of the objective; and release means for discriminating whether the defocus amount detected by said defocus amount detection means of the area selected by said selection means is reliable information, and releasing the prohibiting operation of said prohibition means when it is discriminated that said detected defocus amount is lacking in reliability.

8. A focus detecting apparatus according to claim 7, wherein said prohibition means functions to prohibit the selecting operation of said selection means when the selected area is an area of a particular condition.

* * * * *

UNITED STATES PATENT AND TRADEMARK OFFICE
CERTIFICATE OF CORRECTION

PATENT NO. : 5,585,882
DATED : December 17, 1996
INVENTOR(S) : Akire AKASHI

It is certified that error appears in the above-indentified patent and that said Letters Patent is hereby corrected as shown below:

SHEET 10, FIGURE 7

In (409), "AMD" should read "AND".

COLUMN 1

Line 15, "objective, lens" should read --objective lens,--.

COLUMN 4

Line 62, "SWI is being executed, " should read --SWI,--.

COLUMN 9

Line 49, "the" should be deleted.

Signed and Sealed this

Twenty-fourth Day of June, 1997

Attest:

BRUCE LEHMAN

Attesting Officer

Commissioner of Patents and Trademarks